United States Patent Office 3,344,139
Patented Sept. 26, 1967

3,344,139
2-(DIALKYLAMINOALKOXY)-1,2,4-BENZOTHIA-
DIAZINE 1,1-DIOXIDES AND DERIVATIVES
Peter H. L. Wei, Upper Darby, and Stanley C. Bell, Philadelphia, Pa., assignors to American Home Products Corporation, New York, N.Y., a corporation of Delaware
No Drawing. Filed Nov. 26, 1965, Ser. No. 510,100
7 Claims. (Cl. 260—243)

This invention is concerned with compositions of matter classified in the art of organic chemistry as substituted benzothiadiazines.

The invention, in its principal composition aspect, resides in the concept of a composition of matter being a chemical compound having a molecular structure in which there is attached to the 2-position of the 3,4-dihydro-2H-1,2,4-benzothiadiazine 1,1-dioxide nucleus the 2-diethylaminoethoxy group or its hereinafter disclosed equivalents, and the pharmaceutically-acceptable acid-addition salts thereof.

The tangible embodiments of the composition aspect of the invention possess, in the form of the novel bases, the inherent general physical properties of being oils, which are substantially insoluble in water, but are soluble in polar solvents such as lower aliphatic alcohols. Examination of the compounds produced according to the hereinafter described processes reveals, upon infrared and ultraviolet examination, spectral data confirming the molecular structure hereinabove set forth.

The aforementioned physical characteristics, taken together with the nature of the starting materials and the modes of synthesis, positively confirm the structure of the compositions of the invention.

The tangible embodiments of the invention possess the inherent applied use characteristics of exerting qualitatively varying psycholeptic effects, as evidenced by pharmacological evaluation according to standard procedures. Thus, tangible embodiments show central nervous system activity, diuretic and cardiovascular effects.

The claimed compounds can be characterized by the following general formula:

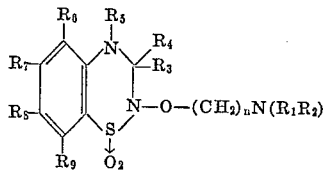

wherein $R_1$ and $R_2$ are the same or different substituents which may be lower alkyl, heterocyclic, or $>(CH_2)n^1$ wherein $n^1=4$ or 5; $R_3$, $R_4$ and $R_5$ each may be H, alkyl, or aryl; $R_6$, $R_7$, $R_8$ and $R_9$ each may be H, alkyl, or halogen; and $n$ may be 2, 3 or 4; and the pharmaceutically-acceptable acid-addition salts thereof.

The claimed compounds are prepared by reacting a dialkylaminoalkylchloride hydrochloride with the corresponding 2-hydroxy-3,4 - dihydro - 2H-1,2,4 - benzothiadiazine 1,1-dioxides which are disclosed and claimed in copending U.S. application Ser. No. 344,843, filed Feb. 14, 1964, now Patent No. 3,318,879. The just named starting material is dissolved in acetone. Next, a small amount of a strong base, such as sodium hydroxide is added and the halide reactant in a minimum amount of water is added. The resulting solution is stirred and cooled. The acetone is decanted and the aqueous solution is washed with acetone. The acetone is removed under reduced pressure and the residue is dissolved in benzene. The resulting benzene solution is washed with water and dried. The benzene is removed under reduced pressure. The residue is dissolved in ether and to the ether solution is added an alcoholic solution of a strong acid such as sulfuric or hydrochloric to precipitate the product in the form of its acid salt. The pure base can be recovered conventionally by treatment with base.

When the compounds of the invention are employed for their central nervous system, diuretic or cardiovascular activity, they may be administered alone or in combination with pharmaceutically acceptable carriers, the proportion of which is determined by the solubility and chemical nature of the compound, chosen route of administration and standard pharmaceutical practice. For example, they may be administered orally in the form of tablets or capsules containing standard excipients, or in the form of solutions; or they may be injected parenterally, that is intramuscularly, intravenously or subcutaneously. For parenteral administration they may be used in the form of sterile solutions containing other solutes, for example, enough saline or glucose to make the solutions isotonic.

The dosage of the present therapeutic agents will vary with the form of administration and the particular compound chosen. It will generally be found that when the compositions are administered orally, larger quantities of the active agents will be required to produce the same effect as a smaller quantity given parenterally. In general, the compounds of this invention are most desirably administered at a concentration level that will generally afford effective results without causing any harmful or deleterious side effects and preferably at a level that is in the range of from about 0.05 gm. to about 1.0 gm. per kg. of body weight per day, althought as aforementioned variations will occur. However, a dosage level that is in the range of from about 0.10 gm. to about 0.5 gm. per kg. of body weight per day is most desirably employed in order to achieve effective results.

The following examples are given by way of illustration and are not to be construed as limitations of this invention, many variations of which are possible without departing from the scope and spirit thereof.

EXAMPLE I 6-chloro-2-(2-diethylaminoethoxy) - 3,7 - dimethyl-3,4-dihydro-2H-1,2,4-benzothiadiazine 1,1-dioxide hydrochloride 6-chloro-3,7-dimethyl-2-hydroxy-3,4-dihydro - 2H - 1,2,4-benzothiadiazine, 1,1-dioxide (3.50 g. or 0.0134 m.) was dissolved in acetone. Sodium hydroxide (2.67 g. or 0.067 m.) in a minimum amount of water was added. With stirring and cooling, diethylaminoethylchloride hydrochloride (4.60 g. or 0.027 m.) in a minimum amount of water was slowly added. The solution was stirred for 4 hours. Acetone was decanted and the aqueous solution washed with acetone. Acetone was removed at reduced pressure and the residue dissolved in benzene. The benzene solution was washed with water. After the benzene solution was dried over anhydrous magnesium sulfate, benzene was removed at reduced pressure. The residue was dissolved in ether and to the ether solution an alcoholic hydrochloric acid solution was gradually added. The salt was collected and recrystallized from dimethoxyethane to give 2.50 g. product, M.P. 110° C.

Elemental analysis confirmed the empirical formula for $C_{15}H_{24}ClN_3O_3S \cdot HCl$.

EXAMPLE II 6-chloro-2-(2-piperidinoethoxy) - 3,7 - dimethyl-3,4-dihydro-2H-1,2,4-benzothiadiazine 1,1 - dioxide hydrochloride 6-chloro-2-(2-piperidinoethoxy)-3,7-dimethyl - 3,4 - dihydro-2H-1,2,4-benzothiadiazine 1,1-dioxide hydrochloride is prepared from 6-chloro-3,7-dimethyl-2-hydroxy- 3,4-dihydro-2H-1,2,4-benzothiadiazine 1,1-dioxide and 2-piperidino ethyl chloride hydrochloride according to the procedure of Example I.

EXAMPLE III

*6-chloro-2-[2-(N-methyl, N-thiazolo)-aminoethoxy]-3,7-dimethyl - 3,4 - dihydro-2H-1,2,4-benzothiadiazine 1,1-dioxide hydrochloride*

6-chloro-2-[2-(N-methyl, N - thiazolo)-aminoethoxy]-3,7 - dimethyl-3,4-dihydro-2H-1,2,4-benzothiadiazine 1,1-dioxide hydrochloride is prepared from 6-chloro-3,7-dimethyl - 2 - hydroxy-3,4-dihydro-2H-1,2,4-benzothiadiazine 1,1-dioxide and 2-(N-methyl-N-thiazoloamino)-ethyl chloride hydrochloride according to the procedure of Example I.

EXAMPLE IV

*7-chloro - 3,6 -dimethyl-2-(3-dimethylaminopropoxy)-3-phenyl-3,4-dihydro-2H-1,2,4-benzothiadiazine 1,1 - dioxide hydrochloride*

7-chloro - 3,6 - dimethyl-2-(3-dimethylaminopropoxy)-3-phenyl-3,4-dihydro-2H-1,2,4-benzothiadiazine 1,1 - dioxide hydrochloride is prepared from 7-chloro-3,6-dimethyl-3-phenyl-3,4-dihydro-2-hydroxy-2H-1,2,4 - benzothiadiazine 1,1-dioxide and 3-dimethylaminopropyl chloride hydrochloride according to the procedure of Example I.

EXAMPLE V

*6-chloro-3,4-dimethyl-2-(2-diethylaminoethoxy) - 3,4-dihydro-2H-1,2,4-benzothiadiazine 1,1 - dioxide hydrochloride*

6-chloro - 3,4 - dimethyl-2-(2-diethylaminoethoxy)-3,4-dihydro-2H-1,2,4-benzothiadiazine 1,1-dioxide hydrochloride is prepared from 6-chloro-3,4-dimethyl-3,4-dihydro-2H-2-hydroxy-1,2,4-benzothiadiazine 1,1 - dioxide and 2-diethylaminoethyl chloride hydrochloride according to the procedure of Example I.

It will be obvious to those skilled in the art of organic chemistry that the other compounds falling within the scope of the general formula given above can be prepared in similar fashion by selection of the desired 2-hydroxy-3,4-dihydro-2H-1,2,4-benzothiadiazine 1,1-dioxide and the dialkylaminoalkyl halide. The final products bear correspondingly the same $R_3$, $R_4$, $R_5$, $R_6$, $R_7$, $R_8$ and $R_9$ substituents as the starting materials. Also, the nature of the 2-substituent, that is, the meaning of the $(CH_2)_nN(R_1R_2)$ moiety is determined by the precise type of dialkylaminoalkyl halide which is employed.

The resulting compounds are the full equivalents of the invention as particularly claimed.

We claim:
1. A compound of the formula:

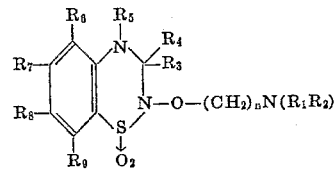

and the pharmaceutically-acceptable acid-addition salts thereof; wherein $R_1$ and $R_2$ are each selected from the group of lower alkyl and

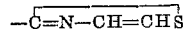

and when joined $>(CH_2)_5$; $R_3$ and $R_4$ and $R_5$ are each selected from the group consisting of hydrogen, lower alkyl and phenyl; $R_6$, $R_7$, $R_8$ and $R_9$ are each selected from the group consisting of H, lower alkyl and chloro, and $n$ is an integer from 2 to 3.

2. A compound as defined in claim 1 which is:
6-chloro-(2-diethylaminoethoxy)-3,7-dimethyl-3,4-dihydro-2H-1,2,4-benzothiadiazine 1,1-dioxide.

3. A compound as defined in claim 1 which is:
6-chloro-(2-diethylaminoethoxy)-3,7-dimethyl-3,4-dihydro-2H-1,2,4-benzothiadiazine 1,1-dioxide, hydrochloride.

4. A compound as defined in claim 1 which is:
6-chloro-2-(2-piperidinoethoxy)-3,7-dimethyl-3,4-dihydro-2H-1,2,4-benzothiadiazine 1,1-dioxide, hydrochloride.

5. A compound as defined in claim 1 which is:
6-chloro-2-[2-(N-methyl, N-thiazolo)-aminoethoxy]-3,7-dimethyl-3,4-dihydro-2H-1,2,4-benzothiadiazine 1,1-dioxide, hydrochloride.

6. A compound as defined in claim 1 which is:
7-chloro-3,6-dimethyl-2-(3-dimethylaminopropoxy)-3-phenyl-3,4-dihydro-2H-1,2,4-benzothiadiazine 1,1-dioxide, hydrochloride.

7. A compound as defined in claim 1 which is:
6-chloro-3,4-dimethyl-2(2-diethylaminoethoxy)-3,4-dihydro-2H-1,2,4-benzothiadiazine 1,1-dioxide, hydrochloride.

No references cited.

NICHOLAS S. RIZZO, *Primary Examiner.*